United States Patent Office 3,346,515
Patented Oct. 10, 1967

3,346,515
METHOD OF PRODUCING ALTERNATING ETHER-SILOXANE COPOLYMERS
James E. Curry, Madison, Ala., assignor to the United States of America as represented by the Administrator of National Aeronautics and Space Administration
No Drawing. Filed Nov. 2, 1965, Ser. No. 506,135
3 Claims. (Cl. 260—2)

This invention relates to a method for producing alternating ether-siloxane copolymers, which display the properties of being relatively stable at elevated temperatures and when exposed to ultraviolet radiation.

The rapid growth of technology in substantially all industries and scientific disciplines and particularly in the aerospace industries has imposed a need on the industries for new materials. These materials are to include properties which are resistant to existing and anticipated destructive elements and forces and which will withstand the rigors of the space environment. This need is evident in every phase of spacecraft and aircraft development. One of the critical areas is the development of improved nonmetallic materials for use as coatings, plastics, adhesives, elastomers, as well as fibers and films. These materials are chemically produced and composed of complicated long chain molecules known as polymers, and a rigorous research program for the development of new polymers has been undertaken to obtain such materials which will meet the aforementioned requirements or needs.

Besides providing new materials which may be fabricated as films or fibers, or which may be applied as coatings and adhesives, one of the basic goals of the research program is to produce thermally stable polymers or copolymers which may be employed in the aforementioned manner, yet, which maintain their beneficial properties at elevated temperatures. The mere existence of polymers or copolymers at elevated temperatures requires that no significant portion of their chemical bonds degrade at that temperature. Additionally, it is desirable that extended ultraviolet radiation does not materially affect the polymers or copolymers.

Heretofore the service temperature of polymers and copolymers is considerably lower than that which is desired. At present, this low service temperature presents severe limitations in some uses of polymers and represents a problem area which, at least in part, has been solved by the development of the alternating ether-siloxane copolymers. Additionally, during long term exposure to space environment, polymers and copolymers have undergone many changes in the chemical and resultant mechanical properties. The chemical and radiation effects of the space environment on polymers and copolymers acting separately or in conjunction with each other has had a tendency to discourage the use of such materials.

The effects of heat and ultraviolet radiation with regard to surface coatings of spacecraft and vehicals are of particular concern. Most satellites and space vehicles have some type of thermal coating on their exterior surfaces and often a coating is applied to interior surfaces. For those satellites and vehicles which generate heat internally from onboard equipment, it is necessary to have very stable thermal surfaces. There are many cases and instances which indicate and require materials with high temperature stability.

Briefly, the instant invention encompasses the polymerization of organic diols with stable silazanes or diaminosilanes having the general formula $$R_1R_2Si(NHR_3)(NHR_4)$$

This results in the production of alternating ether-siloxane copolymers having the general formula of $$\{R_1R_2SiOR_3O\}$$

The copolymers which are produced in a relatively short period of time have relatively high molecular weights, and are resistant to or stable at relatively high temperatures. It is important to understand the factors which contribute to obtaining copolymers displaying the aforementioned properties are the intermediates employed, i.e., diaminosilanes and diols, the method of polymerizing, the temperature at which polymerization is performed, the period of time for polymerization, and the fact the intermediates employed do not form low molecular weight cyclic products to the exclusion of high molecular weight linear polymers. The overall reaction is:

$$R_1R_2Si(NHR_3)(NHR_4) + HO-R_5-OH \longrightarrow$$

$$-\left[\begin{array}{c} R_1 \\ | \\ Si-O-R_5-O \\ | \\ R_2 \end{array}\right]_n - + R_3NH_2\uparrow + R_4NH_2\uparrow$$

The reaction temperature is adjusted to permit the attainment of high molecular weights within a reasonable time, and the complete removal of the amines evolved as a by-product of the polymerization reaction is facilitated by the simultaneous application of heat and vacuum. The reaction may be conducted in a suitably inert high-boiling solvent, or the reactants may be mixed and heated above their melting point in the absence of a solvent.

The alternating ether-siloxane copolymers may be forced into fibers or films, they may be applied as adhesives or coatings, and they may have fillers, pigments and reinforcements admixed therewith if condition of exposure and use so dictate.

The production of polymers containing the $$(R_1R_2SiOR_3O)$$

ordered repeating unit is not unknown, but the prior art processes were deficient in that the polymers were of a low molecular weight. For instance, one known process for preparing polymers of the stated composition is based upon the following alcoholysis reaction:

$$R_1R_2Si(OR_4)_2 + HO-R_3-OH \rightarrow (R_1R_2SiOR_3O)_n + R_4OH\uparrow$$

It is also possible to prepare polymers by the direct reaction of silicon dihalides and organic diols, as shown in the following reaction:

$$R_1R_2SiCl_2 + HO-R_3-OH \rightarrow (R_1R_2SiOR_3O)_n + HCl\uparrow$$

In each case, the polymeric products formed by prior art processes are of a relatively low average molecular weight, and do not possess the desirable mechanical properties associated with true high molecular weight polymers. Furthermore, the starting silicon intermediates are in each case different from those falling within the spirit of this invention.

It has been determined high molecular weight, alternating ether-siloxane copolymers may be produced by employing as intermediates organic diols or dihydroxy compounds, together with stable silazanes or diamino silanes which are polymerized under suitable conditions. Each element of the process including the polymerization process and the intermediates employed contributes to obtaining high molecular weight copolymers.

A typical polymerization is conducted as follows: Equimolar amounts of the intermediate monomers are placed in a thick-walled resin container which is equipped with a liquid take-off condenser and a vacuum source. Heat is applied uniformly to the container to help remove the amine as it is evolved. The monomers may be mixed in the solid state or dissolved in some suitable inert high-boiling solvent. Heat is applied slowly until an effective polymerization temperature of about 300–325° C. is attained. After melting or solution of the monomers occur, the mixture is thoroughly stirred for about 30 minutes at which time a vacuum is applied slowly until about 1 mm. of Hg vacuum is attained. An effective polymerization heating time is maintained for between about 4–7 hours. The effective polymerization temperature, the period of heating considered also with the amount of the vacuum and the intermediates employed all contribute to obtaining high molecular weight copolymers which have the property of being stable at elevated temperatures.

The generic formula for the alternating ether-siloxane copolymers obtained is as aforementioned $[R_1R_2SiOR_3O]$ wherein $R_1$ and $R_2$ are aryl or aryl combinations and $R_3$ is aryl or aryl combinations, alkyl or alkyl combinations, or alkylaryl combinations. Depending upon the monomers and polymerization conditions employed, molecular weights ranging from 40,000 to 180,000 are generally obtained. These are merely typical values and do not constitute the limits of the process described.

One silazane found to be effective for producing the copolymers is bis-(anilino)diphenylsilane. However, it is to be understood that many silazanes or diaminosilanes may be substituted for that which has been identified.

Diols found to be effective for producing the alternating ether-siloxane copolymers are many and varied. For instance, dihydroxybenzene compounds are effective, alkyldihydroxy compounds are considered to be effective and combinations of alkylaryldihydroxy compounds are suitable for producing the copolymers of this invention. Examples of diols which have been employed with significant success are hydroquinone, resorcinol, p,p'-biphenol, 2,7-naphthalene diol, 2,2-propene-bis(4-hydroxybenzene), 1,6-hexanediol, and 4,4'-dihydroxydiphenyl ether. The foregoing list of identified diols are only a few which have been investigated for producing alternating ether-siloxane copolymers.

When each of the identified diols is reacted with the diamino silane derivative above, the following alternating ether-siloxane copolymers are obtained:

| Copolymer Number | Copolymer Structure | Copolymer Name |
|---|---|---|
| I | $[-\underset{\theta}{\overset{\phi}{Si}}-O-C_6H_4-O-]_n$ | Poly-(1,4-bisoxyphenylene)-diphenylsilane. |
| II | $[-\underset{\phi}{\overset{\phi}{Si}}-O-C_6H_4-O-]_n$ (1,3) | Poly-(1,3-bisoxyphenylene)-diphenylsilane. |
| III | $[-\underset{\theta}{\overset{\theta}{Si}}-O-C_6H_4-C_6H_4-O-]_n$ | Poly-(4,4'-bisoxybiphenylene)-diphenylsilane. |
| IV | $[-\underset{\phi}{\overset{\phi}{Si}}-O-C_{10}H_6-O-]_n$ | Poly-(2,7-bisoxynaphthalene)-diphenylsilane. |
| V | $[-\underset{\theta}{\overset{\phi}{Si}}-O-C_6H_4-\underset{CH_3}{\overset{CH_3}{C}}-C_6H_4-O-]_n$ | Poly-diphenylsilyl-[2,2-bis-(4-oxyphenylene)-propane]. |
| VI | $[-Si-O-(CH_2)_6-O-]_n$ | Poly-(1,6-bisoxyhexamethylene)-diphenylsilane. |
| VII | $[-\underset{\phi}{\overset{\phi}{Si}}-O-C_6H_4-O-C_6H_4-O-]$ | Poly-diphenylsilyl-(4,4'-bisoxydiphenylether). |

When a mixed diol composition containing equimolar proportions of p,p'-biphenol and 1,6-hexanediol is reacted with bis-(anilino)diphenylsilane in the manner prescribed, the following alternating ether-siloxane copolymer is obtained.

| Copolymer Number | Copolymer Structure |
|---|---|
| VIII | $[-\underset{\phi}{\overset{\phi}{Si}}-O-C_6H_4-C_6H_4-O-]-[-\underset{\phi}{\overset{\phi}{Si}}-O-(CH_2)_6-O-]_n$ |

This polymer is a random array of the repeating units shown for copolymers III and VI.

An analyses of the copolymers reveal the following properties and characteristics:

| Copolymer | Empirical Formula | Percent | | |
|---|---|---|---|---|
| | | C | H | Si |
| I | $(C_{18}H_{14}O_2Si)_n$ | 73.43 | 4.54 | 10.49 |
| II | $(C_{18}H_{14}O_2Si)_n$ | 74.45 | 4.86 | 10.56 |
| III | $(C_{24}H_{18}O_2Si)_n$ | 78.13 | 4.94 | 8.7 |
| IV | $(C_{22}H_{16}O_2Si)_n$ | 77.67 | 4.74 | 8.92 |
| V | $(C_{27}H_{24}O_2Si)_n$ | 78.41 | 5.94 | 7.10 |
| VI | $(C_{18}H_{22}O_2Si)_n$ | 71.13 | 7.11 | 9.86 |
| VII | $(C_{24}H_{18}O_3Si)_n$ | 75.46 | 4.67 | 7.96 |
| VII | $(C_{21}H_{20}O_2Si)_n$ | 74.78 | 5.08 | 10.7 |

The empirical chemical analyses of the polymers corroborate the assigned structures. These structures are also consistent with the infrared spectra of the polymers.

When a thermogravimetric analysis (TGA) of these polymers was made in a nitrogen atmosphere at a heating rate of 4.1° C. per minute, it was found that they were stable, as evidenced by the absence of detectable weight loss, at temperatures up to 400° C. All of the copolymers described above except VIII are soluble in tetrahydrofuran, dimethylformamide and dimethylsulfoxide. Protective coatings of the soluble polymers may be readily deposited on suitable substrates by the use of these and any other suitable solvents. Suitable pigments reinforcements and fillers may also be admixed with the bulk polymers when dictated by conditions of usage or service.

While the present invention has been described herein in what is considered to be preferred embodiments thereof, it should be recognized that departures may be made therefrom within the scope of the invention, and it should therefore not be limited to the details of the within disclosure, but should be accorded the full scope of the appended claims.

What is claimed is:
1. A method of producing alternating ether-siloxane copolymers which comprises:
   (a) admixing a diaminosilane monomer having the formula $R_1R_2Si(NHR_3)(NHR_4)$ wherein $R_1$, $R_2$, $R_3$, and $R_4$ are aryl groups and a diol monomer selected from the group consisting of hydroquinone, p,p'-biphenol, 2,7-naphthalene diol, 2,2-propene-bis-(4-hydroxybenzene), 1,6-hexanediol, and 4,4'-dihydroxydiphenyl ether.
   (b) heating the resulting mixture to a temperature of about 300° to 325° C.; and
   (c) dwelling at said temperature for a period of about 4 to 7 hours under a vacuum, whereby relatively high-molecular-weight copolymers are obtained.

2. The method according to claim 1 wherein said diaminosilane monomer is bis-(anilino) diphenylsilane.

3. The method according to claim 2 wherein said diol monomer consists of substantially equimolar proportions of p,p'-biphenol and 1,6-hexanediol.

References Cited
UNITED STATES PATENTS

| | | | |
|---|---|---|---|
| 2,676,163 | 4/1954 | Speier | 260—46.5 |
| 2,993,871 | 7/1961 | Shannon et al. | 260—46.5 |
| 3,032,528 | 5/1961 | Nitzsche et al. | 260—448.2 |
| 3,043,798 | 7/1962 | Boyer et al. | 260—46.5 |
| 3,133,110 | 5/1964 | Morehouse et al. | 260—46.5 |

DONALD E. CZAJA, *Primary Examiner.*

LEON J. BERCOVITZ, *Examiner.*

M. I. MARQUIS, *Assistant Examiner.*